United States Patent [19]
Miranti, Jr.

[11] 4,189,968
[45] Feb. 26, 1980

[54] MOBIUS STRIP BANDSAW BLADE
[75] Inventor: Joseph P. Miranti, Jr., Nixa, Mo.
[73] Assignee: Dayco Corporation, Dayton, Ohio
[21] Appl. No.: 938,136
[22] Filed: Aug. 30, 1978
[51] Int. Cl.² ................... B23D 55/08; B27B 13/10
[52] U.S. Cl. ........................... 83/816; 83/661; 83/820
[58] Field of Search ................... 83/661, 816, 820; 76/112

[56] References Cited
U.S. PATENT DOCUMENTS

| 690,678 | 1/1902 | Thomas | 83/661 |
| 2,782,811 | 2/1957 | Johnson | 83/820 |
| 2,795,255 | 6/1957 | Hansen | 83/661 |
| 2,876,809 | 3/1959 | Rentsch et al. | 83/820 X |
| 2,880,768 | 4/1959 | Kolesh | 83/661 |
| 3,534,647 | 10/1970 | Mills | 83/820 |
| 3,668,961 | 6/1972 | Blue | 83/820 X |

FOREIGN PATENT DOCUMENTS 1290751 of 1962 France ................... 83/661
12233 of 1911 United Kingdom ................... 83/661

Primary Examiner—Frank T. Yost
Attorney, Agent, or Firm—Reuben Wolk

[57] ABSTRACT

A bandsaw blade of Mobius strip construction is provided. Also provided is a bandsaw which utilizes such blade.

3 Claims, 11 Drawing Figures

MOBIUS STRIP BANDSAW BLADE

BACKGROUND OF THE INVENTION

The invention relates to bandsaws, and more particularly, to bandsaw blades.

A bandsaw is a continuous ribbon, generally steel, with teeth along one edge, which runs over a pair of wheels. Bandsaws with tilting worktables, and saws in which the frame tilts, thereby permitting angular cuts, are available. Bandsaws are widely used for cutting a wide variety of materials, such as lumber, dimensioned wood stock, metals, plastics, ceramics, meat, etc. Bandsaw blades are available in widths ranging from ⅛-inch and up, and are generally made with a brazed lap joint. Bandsaw blades are obtainable having woodcutting teeth, metal cutting teeth, plastic cutting teeth, a knife edge for cutting paper products, a bonded grit edge for cutting hard materials such as metal or ceramic, and so forth.

One problem common to all bandsaw blades, regardless of the type or tooth configuration, is that the blades become dull with use. The solution heretofore has been to replace, resharpen or refurbish the blade. What is desired is a relatively inexpensive means for extending the useful cutting life of bandsaw blades.

Accordingly, it is an object of the present invention to provide an improved bandsaw blade.

Another object of this invention is to provide a method for making an improved bandsaw blade.

A further object is to provide an improved bandsaw.

Other objects, aspects and advantages of the present invention will be apparent to those skilled in the art from the following description of the invention.

SUMMARY OF THE INVENTION

In accordance with the present invention, there is provided an improved bandsaw blade comprising a metal strip of predetermined length and being of Mobius strip construction and having a cutting edge along the entire continuous edge thereof.

Also provided in accordance with the present invention is a method for making an improved bandsaw blade which comprises providing a metal strip of predetermined length having a cutting surface along both edges thereof, and joining the butt ends of the strip to form a Mobius belt.

Further, and in accordance with the present invention, there is provided an improved bandsaw having a blade which is in the form of a Mobius strip.

DETAILED DESCRIPTION OF THE INVENTION

Figure 1:
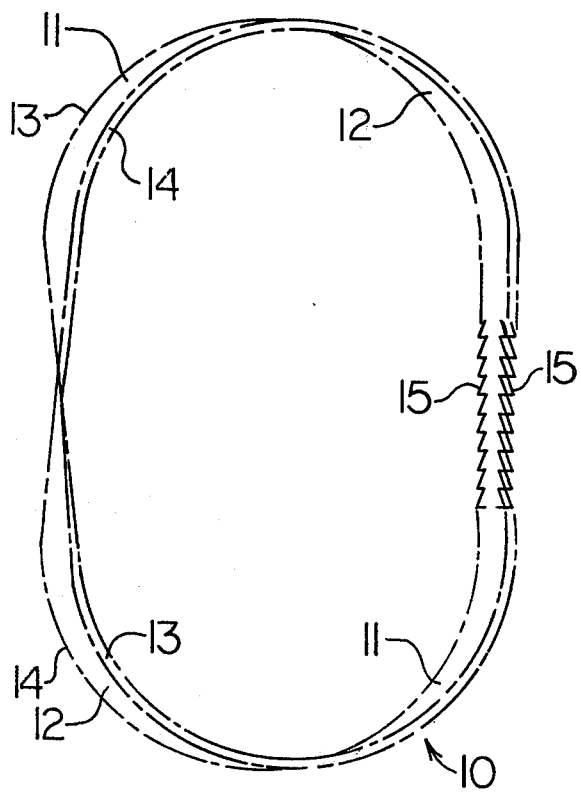
FIG. 1 illustrates the Mobius strip bandsaw blade of this invention.

Referring now to the drawing, FIG. 1 shows a bandsaw blade 10 which comprises a metal strip of predetermined width and length and defining opposing outside and inside surfaces, 11 and 12, respectively, and lefthand and righthand edges, 13 and 14, respectively. The endless blade 10 is of a Mobius strip construction having an odd number of 180° turns in the surfaces 11, 12 for providing in effect one continuous surface and one continuous edge of twice the predetermined length of the blade 10 during rotation thereof.

This principle may be seen by tracing any one of the sides 11 or 12, or the edges 13 or 14 through two complete revolutions of the blade 10. Referring to the lower lefthand portion of the FIGURE, it can be seen that the outside surface 11 and the lefthand edge 13 reverse through the 180° turn to become the inside surface 12 and the righthand edge 14.

The blade 10 is provided with a cutting surface along the one continuous edge 13/14 which, in this embodiment, is illustrated as having a plurality of saw teeth, a representative few being shown, designated generally by the reference numeral 15. All the teeth 15 face the same direction.

Figure 2:
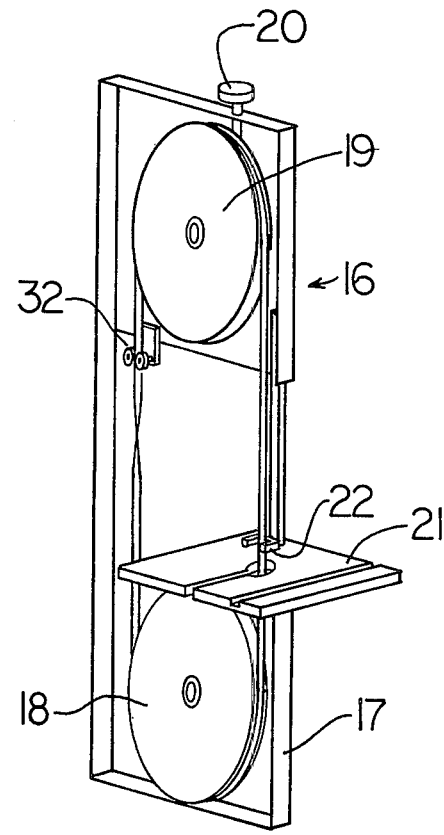
FIG. 2 illustrates a bandsaw having a Mobius strip bandsaw blade.

In FIG. 2, the belt 10 is shown installed in a bandsaw 16 which comprises a frame 17, a lower band wheel 18 mounted for rotation upon the frame 17, an upper band wheel 19 mounted for rotation upon the frame 17, the blade 10 positioned for movement around the upper 19 and lower 18 band wheels, tensioning means 20 for adjusting the upper wheel 19 relative to the lower wheel 18 in order to adjust the tension in the blade 10 positioned therearound, a table 21 mounted upon the frame 17 for supporting a workpiece, upper guide means 22 and lower guide means, below the table 21 and not shown, but essentially similar to the upper guide means 22, and means, not shown, for rotating one of the band wheels, thereby imparting motion to the blade 10.

Figure 3:
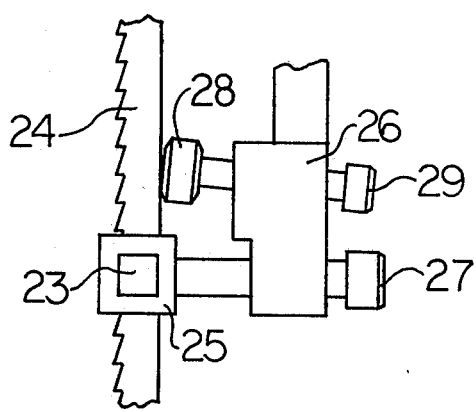
FIG. 3 illustrates a conventional bandsaw blade guide assembly.

A conventional blade guide assembly is shown in FIG. 3 and comprises a pair of blade guides 23 which control side-to-side movement and twisting of the blade 24, a blade guide holder 25 which is mounted for fore-and-aft movement in an assembly block 26, a blade guide adjusting knob 27 which is used to control the movement of the blade guide holder, a thrust bearing 28 also mounted for fore-and-aft movement in the assembly block 26, and a thrust bearing assembly knob 29. The thrust bearing 28 is mounted at a small angle from the blade 24. It supports the blade from the rear and is set to rotate when the blade 24 is pushed against its rim surface when a workpiece is pushed into the blade 24.

Figure 4:
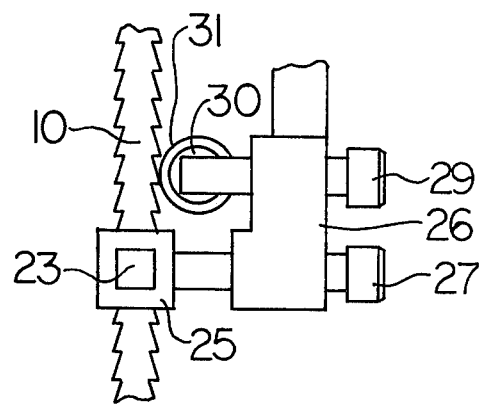
FIG. 4 illustrates a blade guide assembly for use in the bandsaw shown in FIG. 2.

The guide means 22 of the present invention is shown in FIG. 4. It differs from the conventional blade guide assembly in that the thrust bearing 30 is mounted for rotation in the cutting plane of the Mobius blade 10. As a workpiece is pushed into the blade 10, the blade is in turn pushed against the cylindrical outer surface of the bearing 30. In order to prevent premature wearing away of the cylindrical outer bearing surface by the teeth of the blade 10, it may be desirable to provide the bearing 30 with a "tire" 31 made of rubber or a urethane elastomer.

Figure 5:
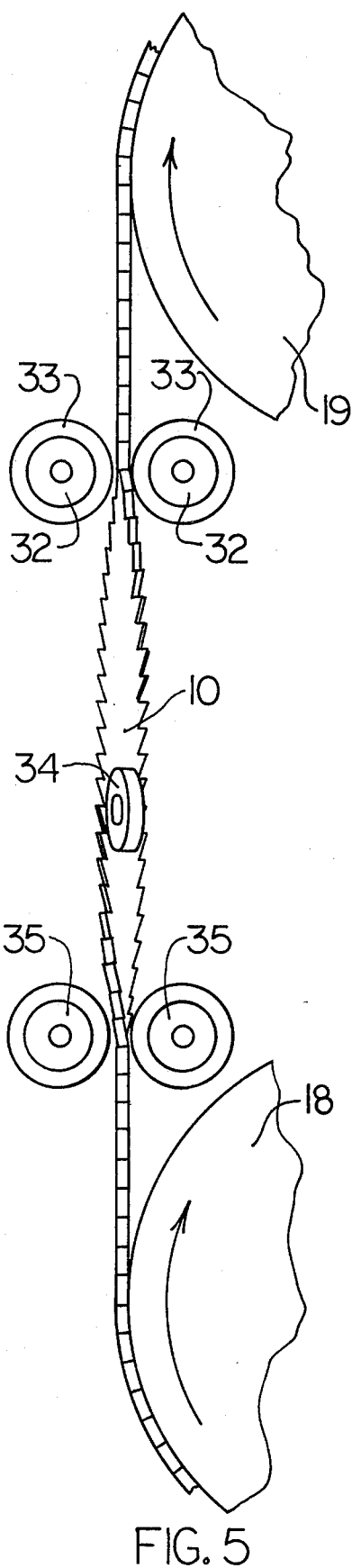
FIG. 5 illustrates a further modification of a bandsaw.

Referring now to FIGS. 2 and 5, the bandsaw 16 may be further modified by the addition of rollers 32, mounted for rotation on the frame 17 on either side of the blade 10. These rollers are mountd near to the wheel 19 but not so near as to interfere with its rotation. The rollers 32 may be required to assure that the blade 10 has made a complete 180° turn prior to contacting the wheel 19. The rollers 32 may be provided with a resilient covering 33 made of rubber or urethane elastomer. It may be further desirable to add rollers 34 and 35 to assist in locating the twist of the blade 10. The roller pair 35 is mounted above the lower wheel 18 and in the same plane as the roller pair 32. The roller pair 34 are mounted between rollers 32 and rollers 35 and at an angle, preferably 90°, to the mounting plane of the rollers 32 and rollers 35.

Figure 6:
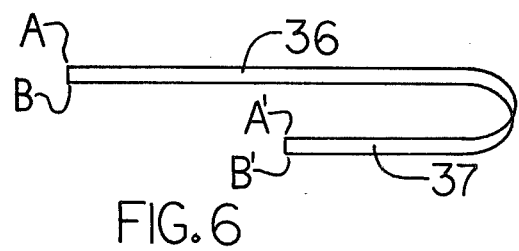
FIG. 6-8 illustrate the steps of making a Mobius strip bandsaw blade.
Figure 7:
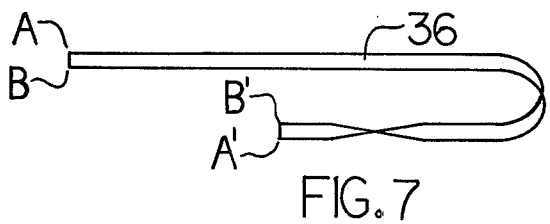
Figure 8:
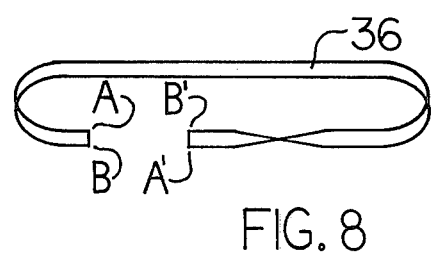

Now, referrign to FIGS. 6-8, the Mobius blade 10 of the prevent invention may be formed by bending one end portion of a strip 36 of flexible metal so as to form an open loop while at the same time twisting the end 37 of the strip 180° about its longitudinal axis and forming a closed loop as shown in the steps clearly illustrated in FIGS. 6-8. When the end 37 is twisted in this manner, the corners A' and B' of the strip of FIG. 6 become inverted with reference to their original disposition during the initial process as shown in FIG. 7. As the loop is formed, the end corners A' and B' remain in an inverted position and are thereafter joined to corners B and A, respectively, as shown in FIG. 8, as by brazing, then grinding the resulting joint. The blade 10 may be made by providing the strip 36 with teeth 15 prior to forming the Mobius blade 10, or the teeth may be formed after the Mobius band is made.

Figure 9:
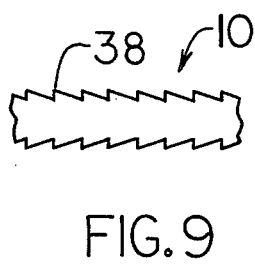
FIGS. 9 and 10 illustrate different cutting edge configurations.
Figure 10:
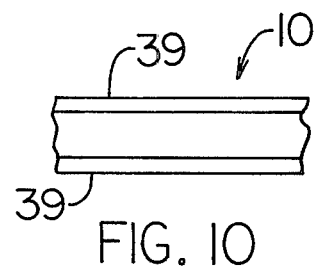
Figure 11:
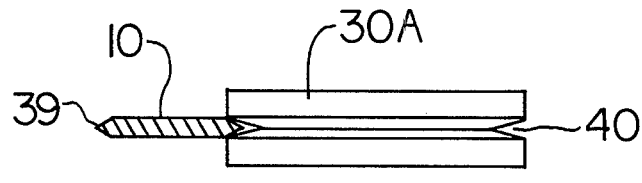
FIG. 11 illustrates a modified thrust bearing for use with a Mobius strip bandsaw blade having a cutting edge.

FIGS. 1, 9 and 10 illustrate representative cutting edges which may be formed on the blade 10. FIG. 1 shows a blade 10 having wood-cutting teeth 15. FIG. 9 shows a blade 10 having metal cutting teeth 38. FIG. 10 shows a blade 10 having a knife edge 39. In order to provide thrust support for the blade shown in FIG. 10 without dulling the knife edge 39, the thrust bearing should be modified as shown in FIG. 11, which illustrates a thrust bearing 30A having a circumferential V-shaped groove 40, the included angle of such groove being smaller than the angle of the knife edge 39, thereby precluding contact between the cutting edge of the knife edge 39 and the bearing 30A.

Reasonable modifications are possible within the scope of this invention without departing from the scope thereof.

I claim:

1. A bandsaw comprising a frame, a lower band wheel mounted for rotation upon said frame, an upper band wheel mounted for rotation upon said frame, a continuous bandsaw blade of Mobius strip construction positioned for movement around said upper band wheel and said lower band wheel, said blade having a knife edge, tensioning means for adjusting said upper band wheel relative to said lower band wheel to adjust the tension in said blade positioned therearound, means for supporting a workpiece to be cut, upper blade guide means and lower blade guide means, wherein each of said blade guide means comprise a thrust bearing mounted for rotation in the cutting plane of said blade, said thrust bearing having a circumferential V-shaped groove, wherein the included angle of said groove is smaller than the angle of said knife edge.

2. The bandsaw of claim 1 further comprising roller means mounted for rotation upon said frame on either side of said blade in the span between said band wheels for guiding said blade onto said upper band wheel.

3. The bandsaw of claim 2 wherein said roller means are provided with a resilient covering.

* * * * *